(12) United States Patent
Zheng et al.

(10) Patent No.: US 11,709,290 B2
(45) Date of Patent: Jul. 25, 2023

(54) HEAT CURABLE EPOXY COMPOSITIONS AND TRANSPARENT HEAT-CURED COATINGS WITH DURABLE ADHESION PREPARED THEREFROM

(71) Applicant: Essilor International, Charenton-le-Pont (FR)

(72) Inventors: Haipeng Zheng, Dallas, TX (US); Christopher Thai, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 3 days.

(21) Appl. No.: 17/281,053

(22) PCT Filed: Oct. 3, 2019

(86) PCT No.: PCT/EP2019/076830
§ 371 (c)(1),
(2) Date: Mar. 29, 2021

(87) PCT Pub. No.: WO2020/070252
PCT Pub. Date: Apr. 9, 2020

(65) Prior Publication Data
US 2021/0349240 A1    Nov. 11, 2021

(30) Foreign Application Priority Data

Oct. 5, 2018   (EP) .................................... 18306323

(51) Int. Cl.
| | |
|---|---|
| G02B 1/04 | (2006.01) |
| C08G 59/38 | (2006.01) |
| C08G 59/70 | (2006.01) |
| C09D 163/00 | (2006.01) |
| G02C 7/10 | (2006.01) |
| C08G 59/04 | (2006.01) |
| C08K 5/3492 | (2006.01) |
| C08K 5/3495 | (2006.01) |
| C08L 63/00 | (2006.01) |

(52) U.S. Cl.
CPC ............. *G02B 1/04* (2013.01); *C08G 59/38* (2013.01); *C08G 59/70* (2013.01); *C09D 163/00* (2013.01); *G02C 7/10* (2013.01)

(58) Field of Classification Search
None
See application file for complete search history.

(56) References Cited

U.S. PATENT DOCUMENTS

| | | | | |
|---|---|---|---|---|
| 2012/0327364 | A1* | 12/2012 | Valeri | C09D 163/00 |
| | | | | 523/435 |
| 2018/0113239 | A1* | 4/2018 | Valeri | C08L 75/04 |
| 2018/0321510 | A1* | 11/2018 | Vetro | G02B 5/208 |
| 2019/0092964 | A1* | 3/2019 | Jang | C08G 59/04 |

FOREIGN PATENT DOCUMENTS

| | | | |
|---|---|---|---|
| EP | 3327091 | 5/2018 | |
| WO | WO 2012/173596 | 12/2012 | |
| WO | WO 2013/013929 | 1/2013 | |
| WO | WO-2016178052 A1 * | 11/2016 | ........ C08F 222/1006 |
| WO | WO 2017/077359 | 5/2017 | |
| WO | WO-2017077359 A1 * | 5/2017 | ............. G02B 1/116 |

OTHER PUBLICATIONS

"ERISYS® GE-60 Sorbitol Glycidyl Ether—Aliphatic Polyfunctional Epoxy Resin CAS No. 68412-01-1", Retrieved on Feb. 25, 2019 from the Internet at http://www.cvc.emeraldmaterials.com/cms/cvc/fis_ftp.downloadPublicDoc?p_filename=GE60_TDS_ENG.pdf&p_doc_type=TDS Technical Bulletin, CVC Thermoset Specialties, An Emerald Performance Materials Company, Jul. 20, 2017.
International Search Report and Written Opinion Issued in Corresponding PCT Application No. PCT/EP2019/076830, dated Oct. 22, 2019.

* cited by examiner

*Primary Examiner* — Randy P Gulakowski
*Assistant Examiner* — Ha S Nguyen
(74) *Attorney, Agent, or Firm* — Norton Rose Fulbright US LLP

(57) ABSTRACT

The present disclosure provides heat-curable coating compositions for optical articles. The coating compositions include a multifunctional epoxy monomer in combination with a UV absorber. The inclusion of at least one multifunctional epoxy monomer and at least one UV absorber provide epoxy coatings that exhibit excellent adhesion on a variety of lens substrates.

15 Claims, No Drawings

HEAT CURABLE EPOXY COMPOSITIONS AND TRANSPARENT HEAT-CURED COATINGS WITH DURABLE ADHESION PREPARED THEREFROM

CROSS-REFERENCE TO RELATED APPLICATIONS

This application is a national phase application under 35 U.S.C. § 371 of International Application No. PCT/EP2019/076830 filed 3 Oct. 2019, which claims priority to European Patent Application No. 18306323.9 filed 5 Oct. 2018. The entire contents of each of the above-referenced disclosures is specifically incorporated by reference herein without disclaimer.

FIELD OF THE INVENTION

The present disclosure relates to heat-curable epoxy coating compositions with UV filtering and durable adhesion, to methods for preparing heat-cured epoxy coatings obtained therefrom, and to the optical articles having such a coating.

BACKGROUND

In the optics field, optical articles may be coated with one or more coatings such as impact-resistant, anti-abrasion/scratch-resistant, and/or antireflection coatings in order to impart various mechanical and/or optical properties onto the articles.

In addition to the functional coatings identified above, optical articles may be given light-filtering functionality to prevent or limit transmission of specific wavelengths of light. The addition of a filtering function should be done without significantly modifying other properties such as abrasion resistance, transparency, or adhesion of the coatings.

Blue light, sometimes referred to as high-energy visible (HEV) light, encompasses wavelenghts from about 400 nm to about 500 nm. Numerous studies have demonstrated that cumulative lifetime exposure to blue-violet light near 430 nm causes photo-oxidation of retinal cells that leads to age-related macular degeneration (AMD). AMD is a leading cause of blindness for people older than age 55. As the proportion of senior citizens in world-wide populations increases, AMD will reach epidemic proportions. To help control the harmful effects of blue light, ophthalmic lens manufacturers have implemented blue cut technology (BCT) to filter and reduce retinal exposure to harmful blue-violet and UV light.

Generally, a coating composition is specifically adapted to one type of substrate and does not provide sufficient adhesive properties on other substrates. The inclusion of blue cut dyes typically requires modifications to coating compositions in order to maintain a useful balance of adhesion, abrasion resistance, and low haze.

EP 3327091 discloses ophthalmic lenses coated with an epoxy-based coating obtained from a curable epoxy functional composition containing an absorbing dye blocking wavelengths which may present an impact on the health.

US 2018/113239 provides abrasion resistant UV-curable coating compositions for ophthalmic lenses comprising at least one epoxy alkoxysilane, at least one polyfunctional acrylate monomer and/or polyfunctional epoxy compound, and at least one UV absorber.

While traditional epoxy coating compositions provide good initial adhesion on high-index optical substrates, these coatings show a remarkable adhesion decrease after prolonged exposure to full-spectrum sunlight. High-index optical substrates are known to degrade under prolonged exposure to the UV light, and a common solution is to add UV absorbers into the substrates or coatings to prevent photodegradation. Some UV absorbers may adversely interact with coating composition chemicals during the curing process, leading to increased haze and reductions in dye absorption wavelength ranges. Therefore, there is a need in the industry for curable coating compositions suitable for blue cut technology that exhibit good adhesion to a broad range of optical substrates over prolonged exposure to sunlight.

SUMMARY

The inventors have found that the addition of a multifunctional hydroxylated epoxy monomer to a heat-curable epoxy coating composition results in a moderate improvement in the adhesion of the resulting coating to several optical substrates, including high-index lenses. Similarly, the inventors have also found that the addition of a UV absorber comprising a hydroxyphenyl benzotriazole or hydroxyphenyl triazine can slightly improve adhesion. Neither addition, on its own, resulted in good adhesion after prolonged exposure to full spectrum sunlight. The combination of a hydroxylated epoxy monomer with a UV absorber has been demonstrated to provide significant improvements in the adhesion and durability of the resulting coating on a variety of optical substrates. Even after 80 hours of exposure to full-spectrum sunlight, the coatings do not lose adhesion. Moreover, the coatings retain the low haze and high abrasion resistance necessary for desirable optical articles.

The present disclosure is drawn to a heat-curable coating composition comprising at least one epoxy monomer comprising two or three epoxy groups, at least one hydroxylated epoxy monomer comprising at least three epoxy groups and one to three hydroxyl groups, at least one UV absorber comprising a hydroxyphenyl benzotriazole or hydroxyphenyl triazine, and at least one epoxy ring-opening catalyst. The composition may further comprise at least one epoxy group and at least one epoxysilane or hydrolysate thereof comprising at least one hydrolyzable group directly linked to the silicon atom. In some aspects, the epoxysilane is (3-glycidyloxypropyl)trimethoxysilane or hydrolyzed (3-glycidyloxypropyl)trimethoxysilane. In some aspects, the epoxy monomer does not include any hydrolyzable groups directly linked to a silicon atom. In some embodiments, the epoxy monomer does not include any hydrolyzable groups directly linked to a silicon atom.

The epoxy monomers and hydroxylated epoxy monomers may comprise at least 50% by weight of all epoxy-containing compounds present in the composition. In some embodiments, the epoxy monomer is a diglycidyl ether, a triglycidyl ether, or a cycloaliphatic epoxy. In some aspects, the hydroxylated epoxy monomer is sorbitol polyglycidyl ether. In some embodiments, the heat curable composition comprises two epoxy monomers, wherein one epoxy monomer is a glycidyl ether and the second epoxy monomer is a cycloaliphatic epoxy. In further embodiments, the composition comprises two epoxy monomers in which a first epoxy monomer is trimethylol ethane triglycidyl ether, a second epoxy monomer is 3',4'-epoxycyclohexylmethyl-3,4-epoxycyclohexane carboxylate, and the hydroxylated epoxy monomer is sorbitol polyglycidyl ether. The epoxy ring-opening catalyst may be an aluminum chelate, aluminum acrylate, aluminum alcoholate, triflic acid, or metal salt of triflic acid. The composition may further comprise at least one absorbing dye. In some embodiments, the absorbing dye at least partially inhibits the transmission of light in at least one selected wavelength range between 380 and 1400 nm.

Some aspects of the disclosure are directed to a method for preparing an optical article comprising coating an optical substrate with a heat-curable coating composition comprising at least one epoxy monomer comprising two or three epoxy groups, at least one hydroxylated epoxy monomer comprising at least three epoxy groups and one to three hydroxyl groups, at least one UV absorber comprising a hydroxyphenyl benzotriazole or hydroxyphenyl triazine, and at least one epoxy ring-opening catalyst, and curing the resulting coating with heat. The composition may further comprise at least one of an absorbing dye and at least one epoxysilane or hydrolysate thereof comprising at least one epoxy group and at least one hydrolyzable group directly linked to the silicon atom. In some aspects, the method comprises coating the optical substrate by spin-coating, spray-coating, 3D printing, roll-to-roll coating, or inkjet printing. The coating may be heated to a temperature between 60 and 140° C. to form a tack-free or completely cured coating.

Some embodiments of the disclosure are directed to an optical article having at least one main surface comprising a coating obtained by depositing on an optical substrate a heat-curable coating composition comprising at least one epoxy monomer comprising two or three epoxy groups, at least one hydroxylated epoxy monomer comprising at least three epoxy groups and one to three hydroxyl groups, at least one UV absorber comprising a hydroxyphenyl benzotriazole or hydroxyphenyl triazine, and at least one epoxy ring-opening catalyst, and curing the resulting coating with heat. The coating exhibits an adhesion of at least 96% to said optical substrate upon at least 40 hours of exposure to full spectrum sunlight when tested according to ISTM 02-010. In some embodiments, the optical substrate comprises a thermoset material or hard coated polycarbonate lens.

Other objects, features and advantages will become apparent from the following detailed description. It should be understood, however, that the detailed description and the examples, while indicating specific embodiments, are given by way of illustration only. Additionally, it is contemplated that changes and modifications will become apparent to those skilled in the art from this detailed description.

DETAILED DESCRIPTION

Various features and advantageous details are explained more fully with reference to the non-limiting embodiments that are detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

The heat-curable coating compositions disclosed herein employ the combination of at least one epoxy monomer, at least one hydroxylated epoxy monomer, at least one uv absorber, and at least one ring-opening catalyst to prepare a coating that provides durable adhesion, low haze, and strong abrasion resistance following prolonged exposure to sunlight. Moreover, the compositions disclosed herein are compatible with the absorbing dyes and additives used for many applications, including blue-cut technology.

Heat-Curable Coating Composition

The epoxy monomers disclosed herein are cyclic ethers and are preferably epoxides (oxiranes). As used herein, the term "epoxide" represents a subclass of epoxy compounds containing a saturated three-membered cyclic ether. The epoxy groups of the epoxy monomer are preferably chosen from glycidyl groups and cycloaliphatic epoxy groups, more preferably from alkyl glycidyl ether groups and cycloaliphatic epoxy groups.

In the present disclosure, the term "alkyl" means a linear or branched, saturated or unsaturated monovalent hydrocarbon-based radical, preferably containing from 1 to 25 carbon atoms. The term alkyl includes acyclic groups preferably containing from 1 to 8 carbon atoms, more preferably from 1 to 6 carbon atoms, such as methyl, ethyl, n-propyl, isopropyl, butyl and n-hexyl groups, and the cycloaliphatic and cycloalkyl groups preferably containing from 3 to 7 carbon atoms, the cycloalkylmethyl groups preferably containing from 4 to 8 carbon atoms.

The term "cycloaliphatic" denotes a saturated or unsaturated but non-aromatic carbocyclic radical comprising one or several optionally fused rings, which may optionally be substituted with one or more of the groups cited above for the aryl group. The term "cycloaliphatic" also includes "heterocycloaliphatic" groups, i.e. non-aromatic monocyclic or polycyclic rings in which one or more carbon atoms of the ring(s) have been replaced with a heteroatom such as nitrogen, oxygen, phosphorus or sulfur. The cycloaliphatic group is preferably a cycloalkyl group.

The term "cycloalkyl" also includes "heterocycloalkyl" groups, i.e. non-aromatic monocyclic or polycyclic rings in which one or more carbon atoms of the ring(s) have been replaced with a heteroatom such as nitrogen, oxygen, phosphorus or sulfur. The heterocycloalkyl group preferably comprises 1 to 4 endocyclic heteroatoms. The heterocycloalkyl groups may be structures containing one or more non-aromatic rings.

The term "aryl" denotes an aromatic carbocyclic radical comprising only one ring (for example a phenyl group) or several, optionally fused, rings (for example naphthyl or terphenyl groups), which may optionally be substituted with one or more groups such as, without limitation, alkyl (for example methyl), hydroxyalkyl, aminoalkyl, hydroxyl, thiol, amino, halo (fluoro, bromo, iodo or chloro), nitro, alkylthio, alkoxy (for example methoxy), aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups. Alternatively, two adjacent positions of the aromatic ring may be substituted with a methylenedioxy or ethylenedioxy group. The term "aryl" also includes "heteroaryl" groups, i.e. aromatic rings in which one or more carbon atoms of the aromatic ring(s) have been replaced with a heteroatom such as nitrogen, oxygen, phosphorus or sulfur.

The epoxy monomer may have two or three epoxy groups per molecule, and does not include any hydrolyzable functional groups directly linked to a silicon atom. In the present disclosure, Si—O—Si groups are considered as not being hydrolyzable groups. In some embodiments, the epoxy monomer does not comprise any silicon atoms.

Examples of hydrolyzable functional groups include but are not limited to alkoxy groups —O—$R^1$, wherein $R^1$ prefereably represents a linear or branched alkyl or alkoxyalkyl group, preferably a $C_1$-$C_4$ alkyl group, acyloxy groups —O—C(O)$R^2$, wherein $R^2$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example, the $NHSiMe_3$ group, alkylenoxy groups such as the isopropenoxy group, and the hydroxyl group —OH.

In some embodiments, the epoxy monomer does not contain reactive functional groups, other than the epoxy groups, such as hydroxyl groups, that are capable of reacting with other polymerizable functional groups present in the composition and that would be linked to the polymer matrix of the coating.

In some embodiments, the epoxy monomer is a diglycidyl ether, triglycidyl ether, or a cycloaliphatic epoxy. Glycidyl ethers are synthetic compounds characterized by the following group in which $R_1$ denotes a monovalent group:

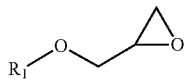

The preferred cycloaliphatic epoxy groups are shown hereunder, in which the hydrogen atoms in the structures may be substituted by one or more substituents such as those cited above as substituents for an aryl group:

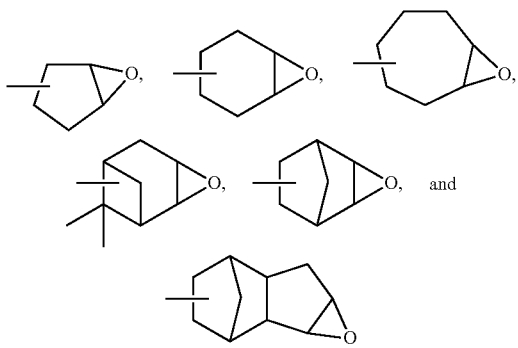

In some embodiments, the epoxy monomer comprises a 3,4-epoxycyclohexyl alkyl group, such as a 3,4-epoxycyclohexyl methyl and a 3,4-epoxycyclohexyl ethyl group.

Examples of epoxy monomers include but are not limited to trimethylolethane triglycidyl ether (Erisys® GE-31 from CVC Thermoset Specialties), trimethylolmethane triglycidyl ether, trimethylolpropane triglycidyl ether (Erisys® GE-30 from CVC Thermoset Specialties), triphenylolmethane triglycidyl ether, trisphenol triglycidyl ether, tetraphenylol ethane triglycidyl ether, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether (Epalloy 5000 from CVC Thermoset Specialties), 3',4'-epoxycyclohexylmethyl-3,4-epoxycyclohexane carboxylate (Uvacure® 1500 from Allnex, Cyracure™ UVR-6110 and UVR™ 6105 from Dow Chemical Company), bis(3,4-epoxycyclohexylmethyl) adipate (Cyracure™ UVR-6128 from Dow Chemical Company), limonene diepoxide (6-methyl-3-(2-methyloxiran-2-yl)-7-oxabicyclo[4.1.0]heptane, Celloxide® 3000 from Daicel Chemical Industries Ltd.), 1,3-bis[2-(3,4-epoxycyclohexyl)ethyl]tetramethyldisiloxane (SIB1092.0 from Gelest), bisphenol A diglycidyl ether (Epon™ Resin 828 from Hexion), hexahydrophthalic anhydride diglycidyl ester (CY 184 from Ciba), and derivatives thereof, and mixtures thereof.

The at least one hydroxylated epoxy monomer may be a cyclic ether and is preferably an epoxide (oxirane). The epoxy groups of the hydroxylated epoxy monomer are preferably chosen from glycidyl groups, more preferably from alkyl glycidyl ether groups. As used herein, the term "hydroxylated" denotes the presence of one or more hydroxyl groups. The term "hydroxyl" denotes an —OH functional group.

In some embodiments, the at least one hydroxylated epoxy monomer has at least three epoxy groups and one to three hydroxyl groups per molecule. In some aspects, the hydroxylated epoxy monomer does not include hydrolyzable groups directly linked to a silicon atom. In some embodiments, the hydroxylated epoxy monomer does not comprise any silicon atoms.

Examples of hydrolyzable functional groups include but are not limited to alkoxy groups —O—$R^1$, wherein $R^1$ prefereably represents a linear or branched alkyl or alkoxyalkyl group, preferably a $C_1$-$C_4$ alkyl group, acyloxy groups —O—C(O)$R^2$, wherein $R^2$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the $NHSiMe_3$ group, alkylenoxy groups such as the isopropenoxy group, and the hydroxyl group —OH.

Examples of hydroxylated epoxy monomers include but are not limited to glycerol diglycidyl ether, diglycerol tetraglycidyl ether, tetraphenylol ethane triglycidyl ether, sorbitol polyglycidyl ether (Erisys GE-60 from CVC Thermoset Specialties), and derivatives thereof, and mixtures thereof. In some aspects, the at least one hydroxylated epoxy monomer is preferably the sorbitol polyglycidyl ether Erisys GE-60.

In one embodiment, the heat-curable coating composition comprises 5-30% by weight of hydroxylated epoxy monomers b) according to the invention, as compared to the total weight of the composition. In another embodiment, the heat-curable coating composition comprises 10-25% by weight of hydroxylated epoxy monomers b) according to the invention, as compared to the total weight of the composition.

In one embodiment, the heat-curable coating composition comprises 20-40% by weight of epoxy monomers a) comprising two or three epoxy groups, wherein the epoxy monomer does not include hydrolyzable groups directly linked to a silicon atom, as compared to the total weight of the composition.

In some embodiments, the heat-curable composition comprises at least one dye preferably in an amount ranging from 0.01 to 5% of the weight of the composition. In some aspects, the absorbing dye at least partially inhibits the transmission of light in at least one selected wavelength range between 380 and 1400 nm.

In some aspects, the UV absorber comprises a hydroxyphenyl benzotriazole or hydroxyphenyl triazine. The UV spectrum has a plurality of bands, including UVA, UVB and UVC bands. Amongst those UV bands reaching the earth surface, UVA band-ranging from 315 nm to 380 nm, and UVB band-ranging from 280 nm to 315 nm—are particularly harmful to the retina. UV absorbers are frequently incorporated in optical articles in order to reduce or prevent UV light from reaching the retina (in particular in ophthalmic lens materials), but also to protect the substrate material itself, thus preventing it from weathering and becoming brittle and/or yellow.

The UV absorber preferably has the ability to at least partially block light having a wavelength ranging from 10 to 450 nm. The UV absorber preferably has the ability to at least partially block light having a wavelength shorter than 400 nm, preferably UV wavelengths below 385 or 390 nm, but also has an absorption spectrum extending to the visible blue light range (400-500 nm).

In addition to UV absorbing functionality, the UV absorber enhances the adhesion of the resulting dry coating composition to an optical substrate. While the UV absorber may provide some adhesion improvements when combined with an epoxy monomer, such as trimethylolethane triglycidyl ether (Erisys GE-31), the inclusion of the UV absorber with both an epoxy monomer and a hydroxylated epoxy monomer in the coating composition provides significant improvements in adhesion.

The UV absorbers capable of enhancing adhesion belong to the hydroxyphenyl benzotriazole or hydroxyphenyl triazine families. Examples of preferable hydroxyphenyl benzotriazole UV absorbers include but are not limited to the family of 2-(2-hydroxyphenyl)-benzotriazoles, such as 2-(2-hydroxy-3-t-butyl-5-methylphenyl) chlorobenzotriazole, 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(2-hydroxy-5-methylphenyl)-2H-benzotriazole (Seesorb 701), 2-(3,5-di-t-amyl-2-hydroxyphenyl) benzotriazole, and the 2-hydroxy-5-acryloxyphenyl-2H-benzotriazoles disclosed in U.S. Pat. No. 4,528,311. Examples of preferable hydroxyphenyl triazine UV absorbers include but are not limited to Tinuvin® 477 and Tinuvin® 479.

Examples of preferable commercially available UV absorbers include but are not limited to the Tinuvin® and Chimassorb® compounds from BASF, Seesorb 701 and 703 from Shipro Kasei Kaisha, UV-400 from Hunan Chemical BV, Chiguard® 1063 and Chiguard® 54005 from Chitec Technology Co., Ltd, and Viosorb 550 from Kyodo Chemicals. More specifically, Tinuvin® 477 and 479, both hydroxyphenyl triazines, are preferable UV absorbers. Suitable UV absorbers may be commercially available as a blend of UV absorbers and hindered-amine light stabilizers (HALS), such as Tinuvin® 5151.

Absorbing, or transmittance-attenuating, dyes provide localized regions of reduced light transmission across specific wavelength regions, i.e., localized transmittance minima. By incorporating dyes that reduce light transmittance across specific regions, non-reduced wavelength regions appear as regions with relatively higher transmittance, i.e., localized transmittance maxima. The inclusion of specific dyes into a lens enhances color contrast by tuning local minima and maxima to achieve the desired transmission spectrum.

Absorbing dyes can be selected to reduce transmittance across a desired wavelength range. Dye concentration can be selected to adjust the degree of reduction in transmittance. The total number of dyes can be adjusted to customize the transmission spectrum. By combining multiple dyes, various transmittance profiles can be tailored for specific applications. The phrases "transmittance-reducing", "transmittance-attenuating", "color absorbing", or "light absorbing" are used interchangably herein.

The amount and/or identity of an absorbing dye may be selected to balance the color of light passing through optical articles. The amount and/or identity of an absorbing dye may be selected to impart a color or tint to an optical article. The absorbing dye may be selected from azo dyes, polymethyne dyes, arylmethyne dyes, polyene dyes, anthracinedione dyes, pyrazolone dyes, anthraquinone dyes, isoindolinone dyes, auinophtalone dyes, naphthalenediamine dyes, and carbonyl dyes. Specific examples of such dyes include but are not limited to ABS420, D&C Violet, Savinyl Blue RS, Perox Blue, Solvent Red 135, and Solvaperm Red RR.

In some embodiments, the epoxy ring-opening catalyst facilitates the polycondensation and/or cross-linking reactions for the epoxy compounds of the composition. Preferred catalysts are capable of curing the epoxy composition at temperatures low enough (preferably ≤110° C., more preferably ≤100° C.) to not damage the underlying substrate and/or cause adverse affects to other coatings or coating components.

In order to obtain storage-stable heat curable compositions, preferred catalysts do not catalyze the epoxy ring-opening at room temperature. This feature prevents premature polymerization or formation of pre-polymers in the coating compositions during storage or while in production, thereby extending the pot-life and shelf-life. In this regard, the catalyst is preferably a blocked catalyst or a latent catalyst (such as a buffered acid catalyst). Blocked catalysts do not react until reaching their respective de-blocking temperatures. The preferred catalysts are inactive at ambient temperature (20° C.) and activated to catalyze epoxy ring-opening only upon heating, generally to 70° C. to 80° C. or more.

Exemplary blocked or latent catalysts are based on trifluoromethanesulfonic acid (triflic acid), dinonylnaphthalene sulfonic acid, dinonylnaphthalene disulfonic acid (DNNDSA), and ammonium antimony hexafluoride (a Lewis acid), metal salt of triflic acid (a Lewis acid, buffered to reduce its reactivity at ambient temperature). Both triflic acid and metal salts of triflic acid are preferred catalysts. Other useful catalysts include carboxylic acid anhydrides such as hexahydrophthalic anhydride, methylhexahydrophthalic anhydride, or Lewis acid catalysts including $BF_3$ and $BCl_3$ amine complexes.

In some embodiments, the epoxy ring-opening catalyst is chosen from aluminum chelates, aluminum acrylates and aluminum alcoholates. The composition preferably does not contain other epoxy ring-opening catalysts such as acid catalysts or ammonium salts of metal anions when aluminum catalysts are employed. Preferred aluminum acrylates and aluminum alcoholates are of the general formulae $Al(OC(O)R)_n(OR')_{3-n}$ and $Al(OSiR''3)_n(OR')_{3-n}$, wherein R and R' are linear or branched chain alkyl groups containing from 1 to 10 carbon atoms, R" is a linear or branched chain, alkyl group containing from 1 to 10 carbon atoms, a phenyl moiety, an acrylate moiety of formula $OC(O)R$, wherein R is as defined just hereabove, and n is an integer from 1 to 3. Preferably, R' is an isopropyl or ethyl group, R and R" are methyl groups.

The epoxy ring-opening catalyst may be used in an amount ranging from 0.1-5% by weight based on the weight of the composition, preferably from 0.2 to 3.5% by weight, more preferably from 0.5 to 3% by weight.

In some embodiments, the heat-curable composition further comprises at least one epoxysilane or hydrolyzate thereof having at least one hydrolyzable group directly linked to the silicon atom and at least one epoxy group. The epoxysilane preferably has from 2 to 6, more preferably 2 or 3 hydrolyzable functional groups directly linked to the silicon atom that lead to an OH group upon hydrolysis. Examples of hydrolyzable functional groups include but are not limited to alkoxy groups —O—$R^1$, wherein $R^1$ preferably represents a linear or branched alkyl or alkoxyalkyl group, preferably a $C_1$-$C_4$ alkyl group, acyloxy groups —O—C(O)$R^2$, wherein $R^2$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example, the NHSiMe$_3$ group, alkylenoxy groups such as the isopropenoxy group, and the hydroxyl group —OH.

Preferred epoxysilanes are epoxyalkoxysilanes, and more preferred are those having one epoxy group and three alkoxy groups. The epoxy groups of the epoxysilane are preferably chosen from glycidyl groups and cycloaliphatic epoxy groups, more preferably from alkyl glycidyl ether groups and cycloaliphatic epoxy groups.

Examples of such epoxysilanes include λ-glycidoxypropyl triethoxysilane, λ-glycidoxypropyl trimethoxysilane (GLYMO), 2-(3,4-epoxycyclohexyl) ethyltrimethoxysilane, 3-glycidoxypropyl methyldiethoxysilane, 2-(3,4-epoxycyclohexyl) ethyltriethoxysilane. Among those silanes, γ-glycidoxypropyltrimethoxysilane (GLYMO) is preferred.

In some embodiments, the epoxysilane is hydrolyzed before being mixed with the other components of the composition. The hydrolysis may be performed as known in the art, by using acidic catalysts (e.g., hydrochloric acid or acetic acid), in the presence of water.

In some embodiments, the epoxysilane is used in an amount of less than 30% by weight relative to the total weight of the composition, preferably less than 20% by weight. This amount can be less than 10% or less than 5% by weight and even 0%. Even though the epoxysilane is generally hydrolyzed prior to mixing with other components of the composition, the amount of epoxysilane will be conventionally defined as the weight of the initial precursor before its hydrolysis.

The heat-curable composition may also comprise several additives, such as surfactants, free radical scavengers, and antioxidants.

Methods of Preparing Optical Articles

A substrate should be understood to mean an uncoated substrate and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more functional coatings or layers.

The substrate of the optical article, coated on at least one main face with a coating, may be a mineral or an organic glass, for instance an organic glass made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company), polycarbonates such as those derived from bisphenol A, (meth)acrylic or thio(meth)acrylic polymers and copolymers such as polymethyl methacrylate (PMMA), urethane and thiourethane polymers and copolymers, epoxy polymers and copolymers, episulfide polymers and copolymers.

Prior to depositing coatings, the surface of the substrate is usually submitted to a physical or chemical surface activating and cleaning treatment, so as to improve the adhesion of the layer to be deposited, such as disclosed in WO 2013/013929.

In some aspects, the epoxy coating is deposited on the optical substrate of the optical article and is preferably in direct contact with said substrate. The deposition is carried out using methods known in the art, preferably by spin-coating, spray-coating, 3D printing, roll-to-roll coating, or inkjet printing the heat-curable composition.

Curing the heat-curable composition can be performed in one or two steps, including a first pre-curing step to a temperature of at least 60° C., preferably at least 70° C., more preferably at least 75° C., typically from 75° C. to 100° C. or from 80° C. to 100° C., for at least 5 minutes, generally from 10 to 25 or 30 minutes, typically 15 minutes, so as to form a tack-free coating, and a second step of heating the optical article coated with the tack-free coating to a temperature higher than or equal to the temperature of the pre-curing step, preferably at least 90° C. or 95° C., more preferably at least 98° C. or 100° C., typically from 100° C. to 140° C., preferably from 100° C. to 115° C., for 1 to 3 hours, generally at least two hours, preferably for 2.5 to 3.5 hours, typically 3 hours, so as to obtain a completely cured insoluble coating. Alternative coating curing process is a first curing step to a temperature of 100° C., preferably at least 110° C., more preferably at least 125° C., for at least 30 minutes, generally 60 minutes, and a second step to a temperature lower than the first step, preferably 100° C. or less, preferably at 80° C. for 30 minutes, generally 60 minutes. The process leads to transparent clear coatings with low haze.

The thickness of the cured coating may be adapted to the specific application required and generally ranges from 0.5 to 50 μm, preferably from 1 to 20 μm, more preferably from 2 to 10 μm.

Optical Article

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The optical article is preferably a transparent optical article, in particular an optical lens or lens blank, more preferably an ophthalmic lens or lens blank. The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field, it will be understood that the embodiments disclosed herein can be applied to optical elements of other types where filtering specified wavelengths may be beneficial, such as, for example, lenses for optical instruments, safety goggles, filters particularly for photography, astronomy or the automobile industry, optical sighting lenses, ocular visors, optics of lighting systems, screens, glazings, etc.

If the optical article is an optical lens, it may be coated on its front main surface, rear main side, or both sides with a coating or coatings as disclosed herein. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article, that is, an optical article that does not provide visual correction.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When a first coating is said to be located under a second coating, it should be understood that the second coating is more distant from the substrate than the first coating.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

"Derivative," in relation to a parent compound, refers to a chemically modified parent compound or an analogue thereof, wherein at least one substituent is not present in the parent compound or an analogue thereof. One such non-limiting example is a parent compound which has been covalently modified. Typical modifications are amides, carbohydrates, alkyl groups, acyl groups, esters, pegylations and the like.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification.

EXAMPLES

Preparation of Wet Coating Compositions C1-C4

Four preliminary epoxy solutions were prepared by mixing 3',4'-epoxycyclohexylmethyl-3,4-epoxycyclohexane carboxylate (epoxy monomer 1, Uvacure® 1500), trimethylol ethane triglycidyl ether (epoxy monomer 2, Erisys GE-31), sorbitol polyglycidyl ether (hydroxylated epoxy monomer, Erisys GE-60), and a solvent comprising propylene glycol methyl ether as the major isomer (Dowanol PM) in one container and allowed to stir for 30 minutes. C1, prepared without a hydroxylated epoxy monomer, was the reference coating.

The preliminary epoxy solutions were then combined with an antimony hexafluoride based catalyst for thermal initiated cationic polymerization (CXC-1612), propylene carbonate, methanol, aluminum acetylacetonate (Al(AcAc)$_3$, epoxy ring-opening catalyst), and a fluoroaliphatic polymeric ester surfactant in dipropylene glycol (Fluorad FC-4434, surfactant), and mixed for 30 minutes.

In another container, (3-glycidyloxypropyl)trimethoxysilane (GLYMO, epoxysilane monomer) was mixed with 0.1 N HCl for at least one hour then added to the four combined solutions prepared above and mixed for 30 minutes. The percentages of each component in the wet coating composition of examples C1-C4 are shown in Table 1.

TABLE 1

Wet Coating Compositions for Examples C1-C4
(hydroxylated epoxy monomer, no UV absorber)

| Component | Wet Coating Compositions | | | |
|---|---|---|---|---|
| | C1 | C2 | C3 | C4 |
| Epoxy monomer 1 (Uvacure ® 1500) | 26.39 | 25.98 | 25.12 | 21.99 |
| Epoxy monomer 2 (Erisys GE-31) | 9.90 | 9.75 | 9.42 | 8.25 |
| Hydroxylated epoxy monomer (Erisys GE-60) | 0.00 | 1.55 | 4.81 | 16.69 |
| Epoxy ring-opening catalyst (Al(AcAc)$_3$) | 1.48 | 1.46 | 1.41 | 1.24 |
| Surfactant (Fluorad FC-4434) | 0.20 | 0.20 | 0.19 | 0.17 |
| Solvent (Dowanol PM) | 50.18 | 49.40 | 47.77 | 41.80 |
| Methanol | 5.84 | 5.75 | 5.56 | 4.87 |
| Epoxysilane monomer (GLYMO) | 4.89 | 4.81 | 4.66 | 4.07 |
| 0.1N HCl | 1.12 | 1.10 | 1.06 | 0.92 |

Different finished single vision (FSV) lenses (CR-39, Trivex, PDQ PC, or MR7) and semi-finished (SF) lenses (MR8 or 1.74) were first cleaned with soap and water and dried. Next, the convex side of each lens was corona treated for 15-30 seconds. Finally, the lenses were cleaned with deionized water and dried. Each lens was spin coated with the above coating composition solutions (C1, C2, C3, and C4) at fixed speeds (400 rpm/8 s and 800 rpm/10 s). The lenses were then pre-cured at 80° C. for 15 minutes and further cured at 100° C. for 3 hours. The thicknesses of the resulting dry coatings on the lenses were between 4 and 7 μm.

Evaluation of C1-C4 Dry Coating Performance

A dry adhesion test, referred to as a crosshatch tape peel adhesion test, was performed on coated articles in accordance with the ISTM 02-010 standard. The test is performed on coated articles by cutting a grid of 25×1 mm squares using a tool that has six (6) parallel razor blades 1 mm apart. The grid is cut into the coating at least 5 to 10 mm from the edge of the lens. Then, a piece of 3M SCOTCH 600 tape that has not been exposed to air is removed from the roll and applied uniformly to the grid using a plastic spatula with approximately 15 to 20 mm of tape off of the edge of the lens. The tape is quickly removed from the lens with a sharp, rapid continuous movement. This is repeated 5 times on the same grid. The adhesion performance of the coating is scored on a scale from 0 to 5. An adhesion score of 0 refers to no coating loss. Adhesion is scored as follows:

TABLE 2

Adhesion Test Scoring

| Adhesion Score | Squares Removed | Area % Left Intact |
|---|---|---|
| 0 | 0 | 100 |
| 1 | <1 | 96-100 |
| 2 | 1 to 4 | 84-96 |
| 3 | >4 to 9 | 64-84 |
| 4 | >9 to 16 | 36-64 |
| 5 | >16 | <36 |

Simulated Ageing

After the coatings are evaluated by a dry adhesion test, each example lens is subjected to the Q-sun test to simulate the effects of sunlight exposure upon the coated optical article. The Q-sun test consists of placing the coated optical articles in a Q-sun® Xe-3 xenon chamber, which reproduces full spectrum sunlight, at a relative humidity of 20% (±5%) and at a temperature of 23° C. (±5° C.), and exposing their convex side to the light for one cycle or two cycles (40 hours in each cycle). If the lens is rated as 0 or 1 in the dry adhesion test, it is further tested in the Q-sun test for one or two cycles; if it is rated as 2 or above in the dry adhesion test or the first cycle of 40 hours, there is no following adhesion test (n/a).

The adhesion scores of each example coating (C1-C4) on each substrate, before and after 40 or 80 hours of Q-sun exposure, are shown in Table 3. The dry coatings of comparative examples C1-C4 show that increasing amounts of hydroxylated epoxy monomer (GE-60) provide improved initial adhesion on high-index substrates before and after Q-sun exposure. The C4 coatings (having relatively higher hydroxylated epoxy monomer content) exhibited maximum adhesion scores on MR7 and MR8 substrates. As the amount of hydroxylated epoxy monomer in the coatings increased, the adhesion properties of the coating on high-index substrates improved. The C4 coatings, however, failed on the 1.74 substrates after 40 hours of Q-sun exposure. In these substrates, increased amounts of hydroxylated epoxy monomer may have decreased dye solubility and/or increased photo-degradation of the dye.

TABLE 3

Adhesion Test Results After Q-Sun Exposure for Examples C1-C4

Q-sun (hours) of Dry Coatings on different lens substrates
Wet Coating Compositions

| | C1 | | | C2 | | | C3 | | | C4 | | |
|---|---|---|---|---|---|---|---|---|---|---|---|---|
| Lens substrate | 0 | 40 | 80 | 0 | 40 | 80 | 0 | 40 | 80 | 0 | 40 | 80 |
| Trivex | 0 | 0 | 0 | 0 | 0 | 0 | 0 | 0 | 0 | 0 | 0 | 0 |
| PDQ PC | 0 | 0 | 0 | 0 | 0 | 0 | 0 | 0 | 0 | 0 | 0 | 0 |
| MR7 | 0 | 5 | n/a | 0 | 3 | n/a | 0 | 1 | 5 | 0 | 0 | 0 |
| MR8 | 5 | n/a | n/a | 4 | n/a | n/a | 1 | 5 | n/a | 0 | 0 | 0 |
| 1.74 | n/a | n/a | n/a | n/a | n/a | n/a | n/a | n/a | n/a | 0 | 4 | n/a |

Comparative Examples with UV Absorbers

Comparative coating composition solutions (C5-C11) were prepared using the same procedure as C1 above except that each solution included a UV absorber selected from the group consisting of: Tinuvin® CarboProtect (TCP), Tinuvin® 477 (T477), Tinuvin® 479 (T479), and Tinuvin® 1130 (T1130). The compositions of comparative examples C9, C10, and C11 contain approximately twice as much of its respective UV absorber as examples C5, C7, and C8. The percentages of each component in the wet coating composition of examples C5-C11 are shown in Table 3.

TABLE 4

Wet Coating Compositions for Examples C5-C11
(UV absorber, no hydroxylated epoxy monomer)

Wet Coating Compositions

| Component (% by weight) | C5 | C6 | C7 | C8 | C9 | C10 | C11 |
|---|---|---|---|---|---|---|---|
| Epoxy monomer 1 (Uvacure ® 1500) | 26.22 | 26.22 | 26.22 | 26.22 | 26.06 | 26.06 | 26.06 |
| Epoxy monomer 2 (Erisys GE-31) | 9.84 | 9.84 | 9.84 | 9.84 | 9.78 | 9.78 | 9.78 |
| Epoxy ring-opening catalyst (Al(AcAc)3) | 1.47 | 1.47 | 1.47 | 1.47 | 1.46 | 1.46 | 1.46 |
| Surfactant (Fluorad FC-4434) | 0.20 | 0.20 | 0.20 | 0.20 | 0.20 | 0.20 | 0.20 |
| Epoxysilane monomer (GLYMO) | 4.86 | 4.86 | 4.86 | 4.86 | 4.83 | 4.83 | 4.83 |
| Solvent (Dowanol PM) | 49.87 | 49.87 | 49.87 | 49.87 | 49.56 | 49.56 | 49.56 |
| Methanol | 5.80 | 5.80 | 5.80 | 5.80 | 5.77 | 5.77 | 5.77 |
| 0.1N HCl | 1.11 | 1.11 | 1.11 | 1.11 | 1.11 | 1.11 | 1.11 |
| UV Absorber | | | | | | | |
| TCP | 0.62 | 0 | 0 | 0 | 1.25 | 0 | 0 |
| T477 | 0 | 0.62 | 0 | 0 | 0 | 0 | 0 |
| T479 | 0 | 0 | 0.62 | 0 | 0 | 1.25 | 0 |
| T1130 | 0 | 0 | 0 | 1.25 | 0 | 0 | 1.25 |

Evaluation of C5-C11 Dry Coating Performance

Each of the above coating compositions (C5-C11) were spin-coated on a MR7 lens substrate and cured according to the same procedure as example C1 above. The adhesion scores of each example coating (C5-C11) on the high-index MR7 substrate, before and/or after 40 or 80 hours of Q-sun exposure, are shown in Table 5. Three of the coatings containing TCP, T477, and T479 (C5, C6, and C7, respectively) exhibited slight adhesion improvements on the high index substrate (MR7) when compared to the reference example (C1); however, the coating containing T1130 (C8) showed no improvement over the reference example. The UV absorbers, on their own, do not induce sufficient adhesion of the coating on a high index substrate after Q-sun exposure. All of the coatings failed the adhesion test on the MR7 substrate after 0 or 40 hours of Q-sun exposure. Furthermore, doubling the amount of UV absorbers in the composition (C9-C11) significantly decreased adhesion of the coatings even without Q-sun exposure.

TABLE 5

Adhesion Test Results After Q-Sun
Exposure for Examples C5-C11

| Dry Coating | C5 | | | C6 | | | C7 | | | C8 | | |
|---|---|---|---|---|---|---|---|---|---|---|---|---|
| Q-sun (hours) | 0 | 40 | 80 | 0 | 40 | 80 | 0 | 40 | 80 | 0 | 40 | 80 |
| MR7 lens | 0 | 3 | n/a | 0 | 4 | n/a | 0 | 2 | n/a | 0 | 5 | n/a |

TABLE 5-continued

Adhesion Test Results After Q-Sun Exposure for Examples C5-C11

| Dry Coating | C9 | | | C10 | | | C11 | | |
|---|---|---|---|---|---|---|---|---|---|
| Q-sun (hours) | 0 | 40 | 80 | 0 | 40 | 80 | 0 | 40 | 80 |
| MR7 lens | 5 | n/a | n/a | 5 | n/a | n/a | 5 | n/a | n/a |

Examples Including Hydroxylated Epoxy Monomers and UV Absorbers (D1-D5)

The following coating composition solutions (D1-D5) were prepared using the same procedure as above, but each solution included both a hydroxylated epoxy monomer (GE-60) and a UV absorber (T479 or T1130). The ratios of hydroxylated epoxy monomer to UV absorber was varied for the different coating composition solutions to obtain optimal coating adhesion on high-index substrates (MR7, MR8, and 1.74 lenses). The percentages of each component in the wet coating composition of inventive examples D1-D5 are shown in Table 6.

TABLE 6

Wet Coating Compositions for Examples D1-D5
(UV absorber + hydroxylated epoxy monomer)

| | Wet Coating Compositions | | | | |
|---|---|---|---|---|---|
| | D1 | D2 | D3 | D4 | D5 |
| Component (% by weight) | | | | | |
| Epoxy monomer 1 (Uvacure 1500) | 22.51 | 21.49 | 21.37 | 20.78 | 21.08 |
| Epoxy monomer 2 (Erisys GE-31) | 8.44 | 8.06 | 8.02 | 7.80 | 7.91 |
| Hydroxylated epoxy monomer (Erisys GE-60) | 13.22 | 17.1 | 17 | 20.47 | 17.17 |
| Epoxy ring-opening catalyst (Al(AcAc)3) | 1.26 | 1.21 | 1.20 | 1.17 | 1.18 |
| Surfactant (Fluorad FC-4434) | 0.17 | 0.16 | 0.16 | 0.16 | 0.16 |
| Epoxysilane monomer (GLYMO) | 4.17 | 3.98 | 3.96 | 3.85 | 3.91 |
| Solvent (Dowanol PM) | 42.8 | 40.86 | 40.63 | 39.51 | 40.03 |
| Methanol | 4.98 | 4.75 | 4.73 | 4.6 | 4.66 |
| 0.1N HCl | 0.95 | 0.91 | 0.91 | 0.88 | 0.89 |
| UV Absorber | | | | | |
| T479 | 1.49 | 1.49 | 2.02 | 0.79 | |
| T1130 | | | | | 3.00 |

Evaluation of D1-D5 Dry Coating Performance

Coating compositions D1, D2, and D3 were each spin-coated onto six different optical substrates (CR-39, Trivex, PDQ PC, MR7, MR8, and 1.74 lenses), and cured according to the same procedure as example C1 above. Coating compositions D4 and D5 were only coated onto the 1.74 lenses, the highest-index optical substrates, but were otherwise prepared in the same manner as examples D1-D3.

The adhesion scores for each dry coating example (D1-D3) on each optical substrate, before and after 40 or 80 hours of Q-sun exposure, are shown in Table 7. Each coating example exhibited excellent adhesion on every substrate even after 80 hours of Q-sun exposure. The adhesion improvement for the combination of hydroxylated epoxy monomers and UV absorbers exceeds any improvement expected based upon the results of the coatings containing only one of the components.

TABLE 7

Adhesion Test Results After Q-Sun Exposure for Examples D1-D3

| Dry Coating | D1 | | | D2 | | | D3 | | |
|---|---|---|---|---|---|---|---|---|---|
| Q-sun (hours) | 0 | 40 | 80 | 0 | 40 | 80 | 0 | 40 | 80 |
| CR-39 | 0 | 0 | 0 | 0 | 0 | 0 | 0 | 0 | 0 |
| Trivex | 0 | 0 | 0 | 0 | 0 | 0 | 0 | 0 | 0 |
| PDQ PC | 0 | 0 | 0 | 0 | 0 | 0 | 0 | 0 | 0 |
| MR7 | 0 | 0 | 0 | 0 | 0 | 0 | 0 | 0 | 0 |
| MR8 | 0 | 0 | 0 | 0 | 0 | 0 | 0 | 0 | 0 |
| 1.74 | 0 | 0 | 0 | 0 | 0 | 0 | 0 | 0 | 0 |

To further examine dry coating examples D1-D3, CR-39 lenses with the dry coatings were subjected to haze and abrasion resistance tests. The results of those tests are shown in Table 8. Despite varying the ratio of GE-60 and T479 in D1, D2, and D3, the results of all three examples indicate low haze and sufficient abrasion resistance.

Haze was measured as disclosed in WO 2012/173596, on a Hazeguard XL 211 Plus apparatus from BYK-Gardner in accordance with the standard ASTM D1003-00. As haze is a measurement of the percentage of transmitted light scattered more than 2.5° from the axis of the incident light, the smaller the haze value, the lower the degree of cloudiness. Generally, for optical articles described herein, a haze value of less than or equal to 0.3% is acceptable, more preferably of less than or equal to 0.2%.

TABLE 8

Haze and Sand Bayer Results for Dry Coating Examples D1-D3 on CR-39 Lenses

| Dry Coating | D1 | D2 | D3 |
|---|---|---|---|
| Haze, % | 0.1 | 0.1 | 0.1 |
| Abrasion | 0.7-0.8 | ~0.7 | ~0.6 |

Specific Application: Blue-Cut Filter Lenses

A coating composition (D6) similar to low haze and abrasion-resistant coating example D2 was prepared. Coating composition D6 was prepared by mixing three blue cut dyes (ABS420, D&C Violet, and Savinyl Blue RS) with epoxy monomer 1 (Uvacure 1500, 3',4'-epoxycyclohexylmethyl-3,4-epoxycyclohexane carboxylate), and propylene glycol methyl ether (solvent, Dowanol PM) in one container, and stirring for 30 minutes to create an epoxy solution. Epoxy monomer 2 (trimethylol ethane triglycidyl ether, Erisys GE-31), hydroxylated epoxy monomer (sorbitol polyglycidyl ether, Erisys GE-60), epoxy ring-opening catalyst (aluminum acetylacetonate, Al(AcAc)$_3$), surfactant (Fluorad FC-4434), and additional solvent (methanol) were added to the epoxy solution and stirred for 30 minutes to 1 hour. In a separate container, epoxysilane monomer ((3-glycidyloxypropyl)trimethoxysilane, GLYMO) was mixed with 0.1 N HCl for at least one hour, added to the previously mixed epoxy solution, and stirred for 30 additional minutes. The percentages of each component in the wet coating composition of example D6 is shown in Table 9. The composition of example 16 is similar to the composition of example D2.

TABLE 9

Wet Coating Composition for Example D6

| Component (% by weight) | D6 w/Blue Cut Dyes |
|---|---|
| Epoxy monomer 1 (Uvacure ® 1500) | 21.48 |
| Epoxy monomer 2 (Erisys GE-31) | 8.05 |
| Hydroxylated epoxy monomer (Erisys GE-60) | 17.09 |
| UV Absorber (Tinuvin ® 479) | 1.49 |
| Blue-cut dye 1 (ABS420) | 0.02 |
| Color balance 2 (D&C Violet) | 0.02 |
| Color balance dye 3 (Savinyl Blue RS) | 0.01 |
| Epoxy ring-opening catalyst (Al(AcAc)$_3$) | 1.21 |
| Surfactant (Fluorad FC-4434) | 0.16 |
| Epoxysilane monomer (GLYMO) | 3.98 |
| Solvent 1 (Dowanol PM) | 40.83 |
| Solvent 2 (methanol) | 4.75 |
| 0.1N HCl | 0.91 |

The convex sidse of three lenses (two CR-39 lenses and one PDQ PC lens) were first corona treated for 15-30 seconds. The lenses were then cleaned with soap and water and dried. Each lens was spin coated with the above coating composition solution (D6) at fixed speeds (400 rpm/8 s and 800 rpm/10 s). The lenses were then pre-cured at 80° C. for 15 minutes and further cured at 100° C. for 3 hours. The thicknesses of the resulting dry coatings on the lenses were between 5.4 and 6.5 µm.

Evaluation of D6 Dry Coating Performance

The coating on all three lenses showed the same adhesive performances as the coatings on the same lenses in example D2. Additional characteristics such as haze, abrasion resistance, and blue cut performance (BVC %) for the dry coatings are shown below in Table 10.

The light transmission factor in the visible spectrum Tv was measured in transmission mode (incidence angle: 0°) from a wearer's view angle using a Cary 50 spectrophotometer from Hunter, with the back (concave) side of the lens (2 mm thickness at the center) facing the detector and light incoming on the front side of the lens. Tv was measured under D65 illumination conditions (daylight).

Protection from phototoxic blue light by the inventive coating can be evidenced by calculating the mean blue light protection factor BVC between 400 nm and 450 nm, weighted by the light hazard function B'(λ), based on the transmission spectrum. Such factor is defined through the following relation and measured at 0° incidence:

$$BVC = 100\% - \frac{\int_{400}^{450} B'(\lambda) \cdot T(\lambda) \cdot d\lambda}{\int_{400}^{450} B'(\lambda) \cdot d\lambda}$$

wherein T(λ) represents the lens transmission factor at a given wavelength, measured at an incident angle between 0 to 17°, preferably at 0°, and B'(λ) represents the light hazard function shown on FIG. 1 of publication WO 2017/077359, in the name of the Applicant (relative spectral function efficiency). Said light hazard function results from work between Paris Vision Institute and Essilor International. It can be seen on this figure that blue light is the most dangerous to human eye at 428-431 nm. A few values of the B'(λ) function between 400 and 450 nm are given hereunder:

| Wavelength (nm) | Weighting coefficient B'(λ) |
|---|---|
| 400 | 0.1618 |
| 410 | 03263 |
| 420 | 0.8496 |
| 430 | 1.00 |
| 440 | 0.6469 |
| 450 | 0.4237 |

TABLE 10

Haze, Sand Bayer, and Blue Cut Results for Dry Coating Example D6

| Coating | D6(a) | D6(b) | D6(c) |
|---|---|---|---|
| FSV Plano Lens | CR-39 | CR-39 | PDQ PC |
| Thickness (µm) | 5.4 | 6.5 | 5.5 |
| Haze (%) | 0.1 | 0.1 | 0.2 |
| Abrasion | 0.7 | 0.7 | 0.6 |
| BVC (%) | 24 | 27 | 29 |

In a separate set of experiments, FSV CR-39 plano lenses were caustic cleaned first, then dip coated with wet coating composition D6 at a draining speed of 1.7 mm/s. The resulting leanses exhibited greater than 40% blue cut blocking.

In summary, the inclusion of both a hydroxylated epoxy monomer and a UV absorber in a heat-curable coating composition results in excellent adhesion on high-index optical substrates, before and after prolonged Q-sun exposure. Moreover, this inventive composition allows for the inclusion of blue-cutting, color-balancing, and other dyes to provide durable, transparent, and effective coatings for optical articles, such as ophthalmic lenses.

The claims are not to be interpreted as including means-plus- or step-plus-function limitations, unless such a limitation is explicitly recited in a given claim using the phrase (s) "means for" or "step for," respectively.

The invention claimed is:

1. A heat-curable coating composition, comprising:
   a) 20-40% by weight as compared to the total weight of the composition of at least one epoxy monomer comprising two or three epoxy groups, wherein the at least one epoxy monomer does not include hydrolyzable groups directly linked to a silicon atom;
   b) 10-25% by weight as compared to the total weight of the composition of at least one hydroxylated epoxy monomer comprising at least three epoxy groups and one to three hydroxyl groups, wherein the hydroxylated epoxy monomer does not include hydrolyzable groups directly linked to a silicon atom;
   c) at least one UV absorber comprising a hydroxyphenyl benzotriazole or hydroxyphenyl triazine; and
   d) at least one epoxy ring-opening catalyst, wherein said epoxy ring-opening catalyst is an aluminum chelate, aluminum acrylate, aluminum alcoholate, triflic acid, or metal salt of triflic acid.

2. The composition of claim 1, wherein the epoxy monomer is a diglycidyl ether, a triglycidyl ether, or a cycloaliphatic epoxy.

3. The composition of claim 1, wherein the hydroxylated epoxy monomer is the sorbitol polyglycidyl ether of formula:

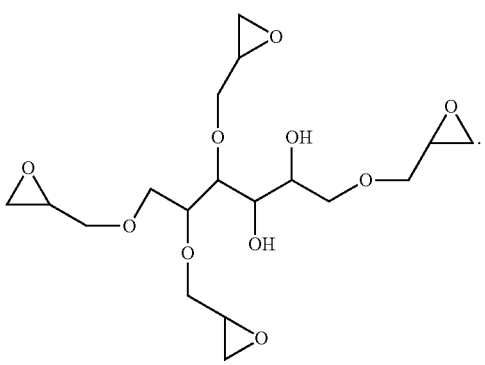 [SMILES: OC(COCC1CO1)C(O)C(OCC1CO1)C(COCC1CO1)OCC1CO1]

4. The composition of claim 1, wherein the epoxy monomers and hydroxylated epoxy monomers comprise at least 50% by weight of all epoxy-containing compounds present in the composition.

5. The composition of claim 1, wherein the composition further comprises at least one epoxysilane comprising at least one hydrolyzable group directly linked to the silicon atom and at least one epoxy group, or a hydrolyzate thereof.

6. The composition of claim 5, wherein the epoxysilane is (3-glycidyloxypropyl)trimethoxysilane or hydrolyzed (3-glycidyloxypropyl)trimethoxysilane.

7. The composition of claim 6, further defined as comprising the following epoxy monomers: trimethylol ethane triglycidyl ether and 3',4'-epoxycyclohexylmethyl-3,4-epoxycyclohexane carboxylate, and said hydroxylated epoxy monomer is the sorbitol polyglycidyl ether of formula:

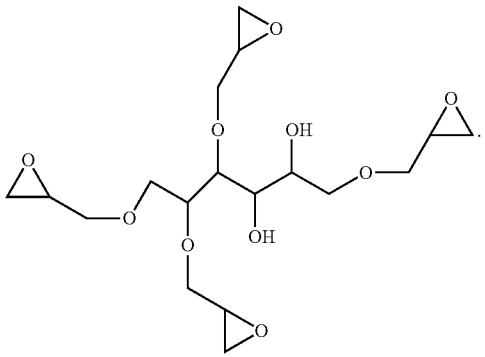 [SMILES: OC(COCC1CO1)C(O)C(OCC1CO1)C(COCC1CO1)OCC1CO1]

8. The composition of claim 1, further comprising at least one absorbing dye.

9. The composition of claim 8, wherein the absorbing dye at least partially inhibits the transmission of light in at least one selected wavelength range between 380 and 1400 nm.

10. A method of preparing an optical article, comprising:
   a) coating an optical substrate with the heat-curable coating composition of claim 1; and
   b) curing the resulting coating with heat.

11. The method of claim 10, wherein coating an optical substrate comprises spin-coating, spray-coating, 3D printing, roll-to-roll coating, or inkjet printing.

12. The method of claim 10, wherein the resulting coating is heated to a temperature between 60° C. and 140° C. to form a tack-free or completely cured coating.

13. An optical article having at least one main surface comprising a coating obtained by depositing on an optical substrate and curing a composition according to the method of claim 10, wherein said coating, following at least 40 hours of exposure to full spectrum sunlight, exhibits an adhesion of at least 96% to said optical substrate when tested according to ISTM 02-010.

14. The optical article of claim 13, wherein the optical substrate comprises a thermoset material or hard coated polycarbonate lens.

15. A heat-curable coating composition, comprising:
   a) 20-40% by weight as compared to the total weight of the composition of at least one epoxy monomer comprising two or three epoxy groups, wherein the at least one epoxy monomer does not include hydrolyzable groups directly linked to a silicon atom and comprises trimethylol ethane triglycidyl ether and 3',4'-epoxycyclohexylmethyl-3,4-epoxycyclohexane carboxylate;
   b) 10-25% by weight as compared to the total weight of the composition of at least one hydroxylated epoxy monomer comprising at least three epoxy groups and one to three hydroxyl groups, wherein the hydroxylated epoxy monomer does not include hydrolyzable groups directly linked to a silicon atom;
   c) at least one UV absorber comprising a hydroxyphenyl benzotriazole or hydroxyphenyl triazine; and
   d) at least one epoxy ring-opening catalyst.

* * * * *